Diebold & Obernesser,

Permutation Lock.

No. 106,472.  Patented Aug. 16, 1870.

ATTEST,
S. S. Morris
M. W. Oliver

INVENTORS,
Carl Diebold
Jakob Obernesser

United States Patent Office.

CHARLES DIEBOLD AND JACOB OBERNESSER, OF CINCINNATI, OHIO, ASSIGNORS TO CHARLES DIEBOLD AND JACOB KIENZLE, OF SAME PLACE.

Letters Patent No. 106,472, dated August 16, 1870.

IMPROVEMENT IN PERMUTATION LOCKS.

The Schedule referred to in these Letters Patent and making part of the same.

*To all whom it may concern:*

Be it known that we, CHARLES DIEBOLD and JACOB OBERNESSER, both of the city of Cincinnati, in the county of Hamilton and State of Ohio, have invented certain new and useful Improvements in Permutation Locks; and we do hereby declare that the following is a full, clear, and exact description of the construction and operation of the same, reference being had to the annexed drawing making part of this specification, in which—

The invention relates to the devices for opening and closing of the jaws L in unlocking and locking the safe.

Figure 1:
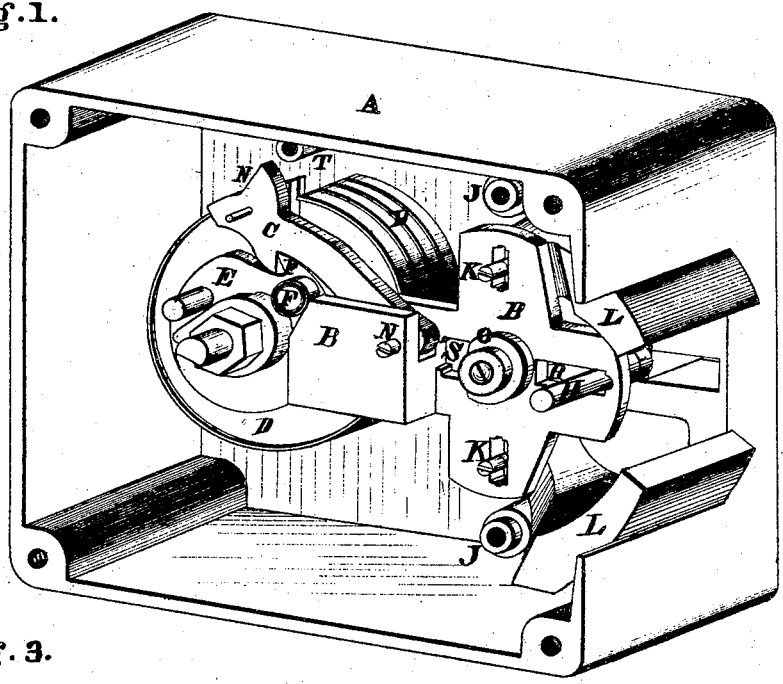
Figure 1 is a perspective view of the lock, with the back plate of the lock-case removed.

In the drawing, fig. 1—

A is the lock-case.

B, the sliding plate, which operates the jaws, and which may be cast in one piece.

C, the dog-lever, pivoted at N, as shown.

D D, the combination wheels.

E, the cam that operates the parts.

F, a fly attached to the cam, and which serves to push forward the plate B B.

K K are pins securely attached to the jaws L L, and passing through the slots, as shown in the drawing, fig. 1

The jaws L L are each attached by the stump passing through an eye at the end of each jaw, and, in opening and closing, partially revolves on said stump.

Said stump is not shown in the drawing, being concealed by the washer, O, on the end of it.

The plate G is secured to the stumps J J by screws and washers, and, when in place, the notch M embraces and supports the pin H The operation of the lock is as follows, viz:

When the hook of the dog-lever engages the notch P on the cam, and the spindle is turned to the right, the plate B B is drawn back, sliding on the stump back of O and pin H, through the slots R and S, and, at the same time, the jaws L L are drawn back, and opened by means of the pins K and K. If, now, the spindle be turned to the left, the fly F pushes forward the plate B B by pressing against the chamfer on the end of the plate, and again closes the jaws.

When the dog-lever is raised by the incline of the cam, so that the dog rests on the wheels D D, the projection N is in contact with the stump or rib T, which prevents the jaws being opened until the dog enters the notches in the wheels D D.

We have found, in practice, that the above-described devices for opening and closing the jaws are very effective, and the jaws open easily, and without any hitch or check in its movement, while the simplicity of the arrangement makes the lock a very durable one, but little liable to get out of order, and easily repaired when injured.

It will also be seen from the drawing that the dog-lever C is so arranged as to most effectually secure its dropping into the notch on the cam at the proper time.

In the drawing—

Figure 3:
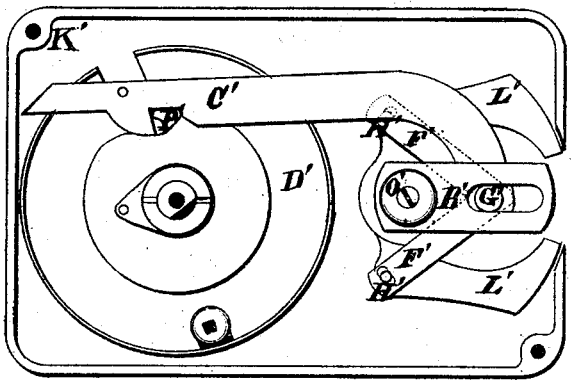
Figure 3 represents a modification of the invention hereinafter described.
Figure 2:
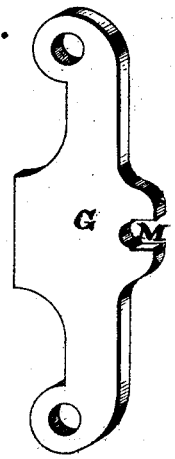
Figure 2 is a plate, which, when in place, is attached to the stumps J J by means of screws and washers, and the notch M embraces and supports the pin H.

Fig. 3 represents a modification of our device for opening and closing the jaws, and which is more expressly designed to be employed on small fire-proof safes.

In this form—

D' represents the combination-wheels.

C', the dog-lever.

L' L', the jaws.

O', the stump to which the jaws are attached.

B', a slotted plate, attached to the stump O' by means of a screw and washer, as shown in the drawing.

F' F" is a bent plate, with a short pin, G', at the angle of this plate, and which pin passes through the end of the dog-lever C' and the slot in the plate B', as shown at G'.

The ends of this plate F' F" engages the pins H' H' by means of slots, as shown in the drawing, said pins being securely attached to the jaws L' L'.

When the wheels D' are brought to the proper relative positions to permit the dog to drop into the notches in these wheels, and the spindle is turned to the right, the hooked projection P" on the cam engages the hook on the dog-lever, and carries it back, which opens the jaws, as shown in the drawing. If, now, the spindle be turned to the left, the projection P' pushes the dog-lever forward, and, with it, the plates F' F", and the jaws close.

When the dog-lever is raised by the incline of the cam, so that the dog rests on the wheels D', the end of the dog-lever is in contact with the lock-case at K', which prevents the jaws being opened until the dog enters the notches in the wheels D'.

What we claim as our invention, and desire to secure by Letters Patent, is—

1. The combination of the pivoted jaws L L, the sliding plate B, the dog-lever C, and disks D, all constructed and arranged to operate substantially as described.

2. The combination of the plate G with the pin H and plate B B, substantially as and for the purposes described.

C. DIEBOLD.
J. OBERNESSER.

Witnesses:
S. S. MORRIS,
M. M. OLIVER.